(No Model.) 3 Sheets—Sheet 1.
B. S. BENSON.
TRACTION ENGINE AND STUBBLE HARVESTER AND CONSUMER.
No. 281,604. Patented July 17, 1883.
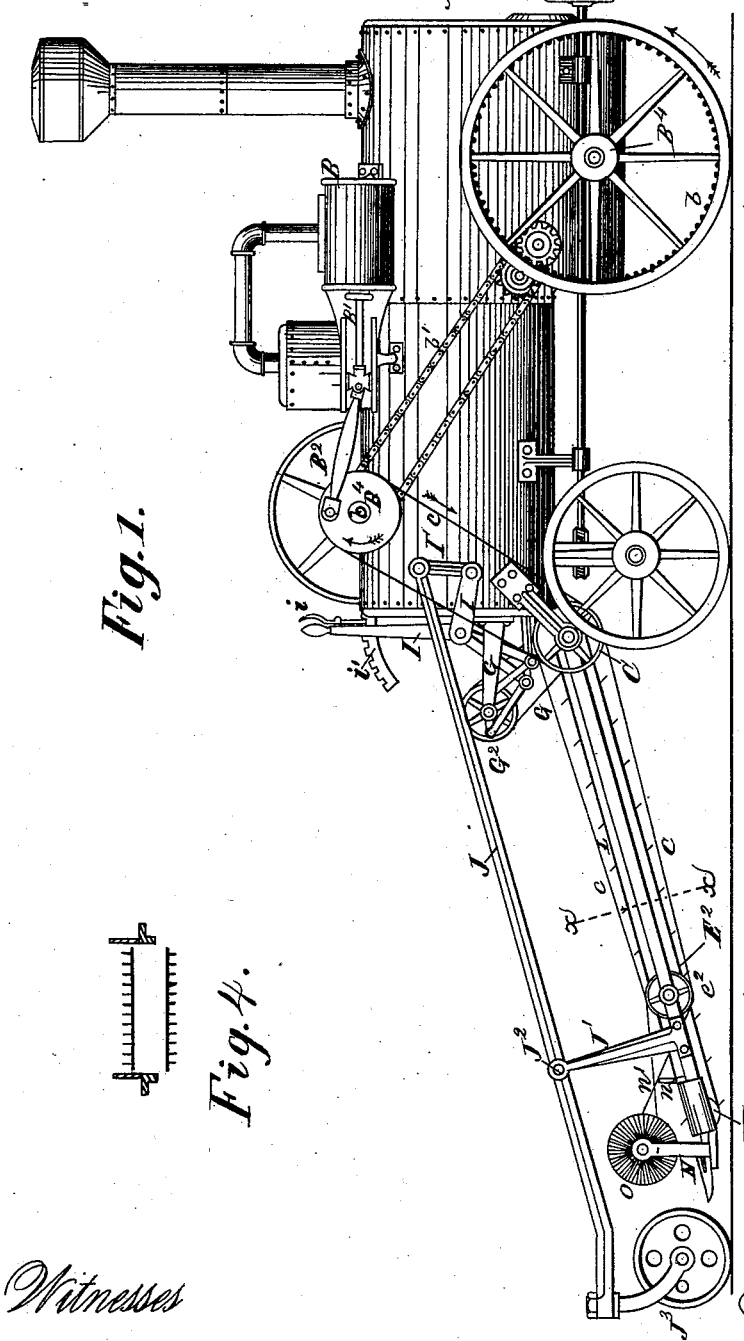
Witnesses
W. A. Bertram
H. Demuth
Inventor
B. S. Benson
by Brashears & Williams
Attorneys

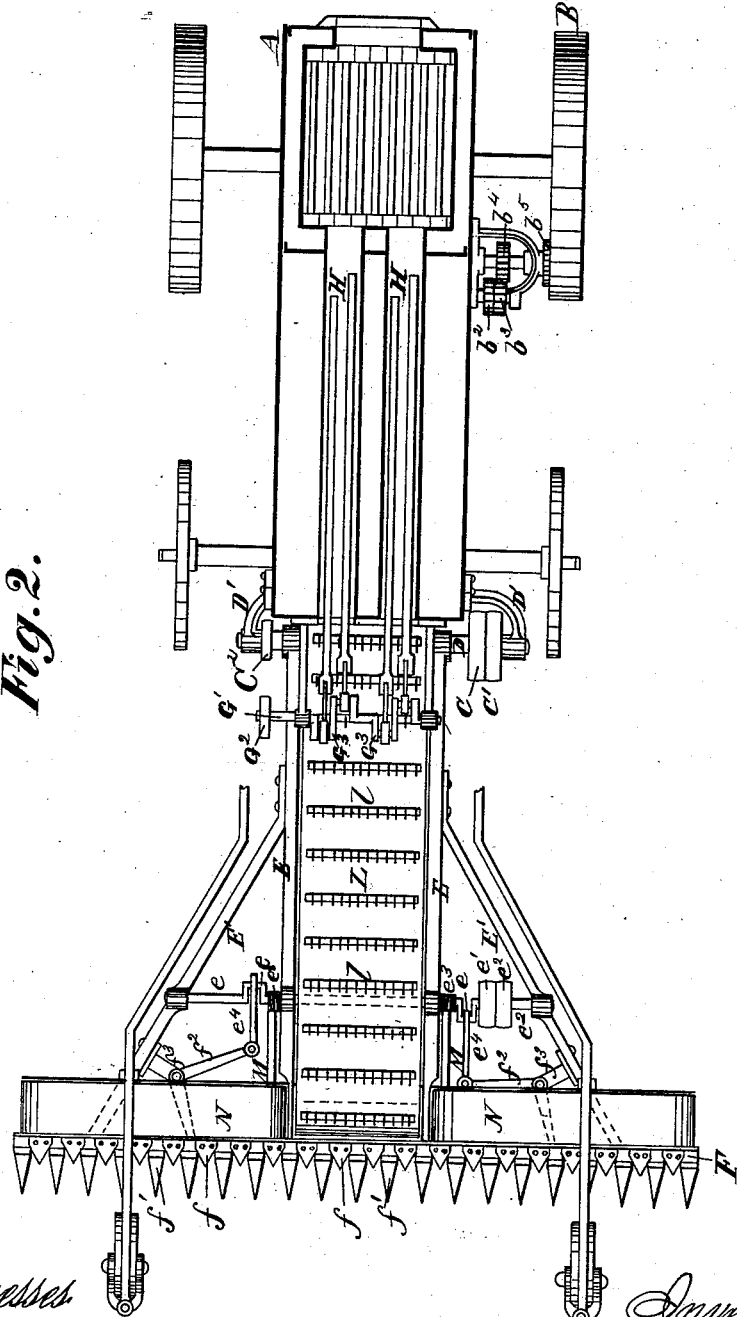

(No Model.)  3 Sheets—Sheet 3.
B. S. BENSON.
TRACTION ENGINE AND STUBBLE HARVESTER AND CONSUMER.
No. 281,604.  Patented July 17, 1883.
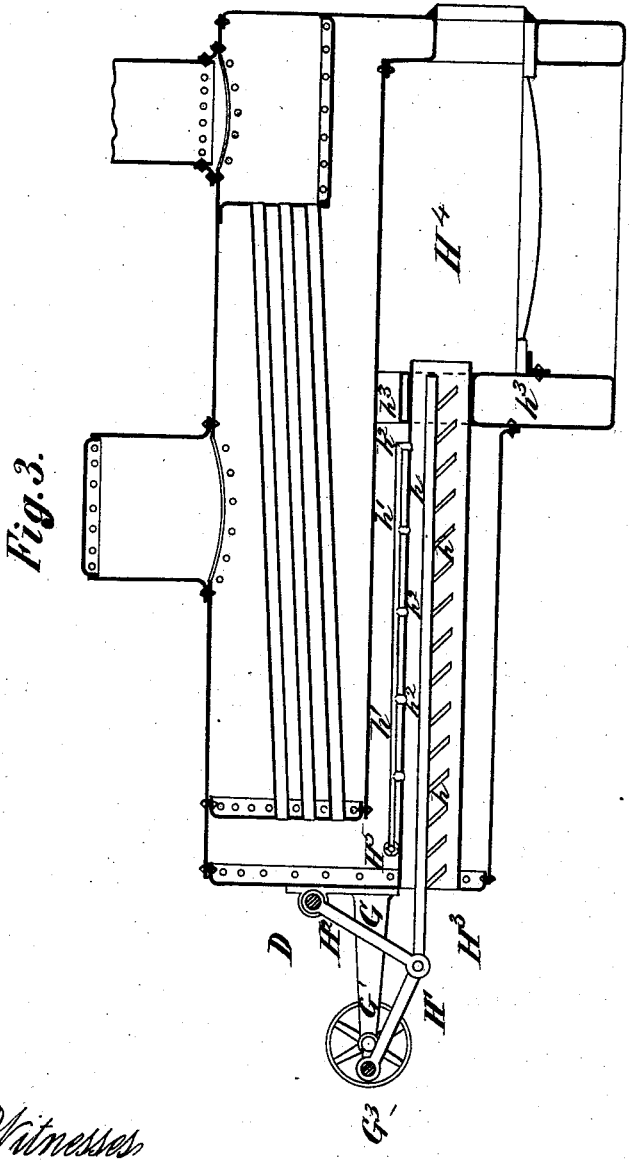
Witnesses
W. A. Bertram
H. Demuth
Inventor
B. S. Benson
by Brashears & Williams
Attorney

UNITED STATES PATENT OFFICE.

BENJAMIN S. BENSON, OF BALTIMORE, MARYLAND.

TRACTION-ENGINE AND STUBBLE HARVESTER AND CONSUMER.

SPECIFICATION forming part of Letters Patent No. 281,604, dated July 17, 1883.

Application filed November 17, 1882. (No model.)

*To all whom it may concern:*

Be it known that I, BENJAMIN S. BENSON, a citizen of the United States, residing at Baltimore, Maryland, have invented certain new and useful Improvements in Traction-Engines and Stubble Harvesters and Consumers, of which the following is a specification, reference being had to the accompanying drawings, forming part hereof, in which—

Figure 1 is a side view of my invention. Fig. 2 is a plan view thereof, the upper portion of the engine and boiler being removed. Fig. 3 is a detail view, showing some of the interior mechanism of the boiler; and Fig. 4 is a section on line $x$ $x$, Fig. 1.

It is well known that on the great wheat-fields of Dakota the stubble is a great nuisance when it is desired to clear the fields in preparing for a succeeding crop. It is also a desideratum to get rid of as much straw as possible by cutting the wheat as high as possible from the ground.

My invention is designed to get rid effectually of the stubble nuisance by utilizing it as fuel for the traction-engine which will be used to plow the field when preparing the ground for planting.

To this end my invention consists in combining with a traction-engine a machine in the nature of a harvester which will be placed in front of the engine when it is used to draw the plows, and which will cut the stubble and convey it into the fire-box of the engine, thus furnishing it with fuel.

My invention also consists in certain details of construction and arrangement of the devices whereby this result is attained, and whereby the proper adjustments may be made to meet the various contingencies which may arise in carrying out the object intended.

My invention will be first fully described, and then particularly pointed out in the claims.

Referring to the drawings by letter, A is the boiler; B, the cylinder; B', the piston-rod; B², the pitman; B³, the face-plate; $b$, the main shaft, having fly-wheel and sprocket-wheel; B⁴, the driving-wheel; $b'$, the drive-chain; $b^2$, sprocket-wheel; $b^3$, $b^4$, $b^5$, and $b^6$, gears for driving the drive-wheel, all of which parts are for propelling an ordinary traction-engine. The face-plate B³ is utilized as a belt-pulley, from which passes a belt, $c$, to a pulley, C, on a shaft, D, mounted in brackets D', attached to the side of the boiler. On this shaft are also the pulleys C' and C², and upon it are swung a pair of arms or brackets, E, which, in connection with a pair of braces, E', attached near their mid-length, form the means whereby is attached a cutter-bar, F, having knives $f$ and guard-fingers $f'$, of ordinary construction, and adapted to cut grain or grass as does any ordinary mower or reaper.

Mounted in brackets G, attached to the end of the boiler, is a shaft, G', provided with a pulley, G², and two double cranks, G³. This shaft is driven by a belt, $g$, from the pulley C² on the shaft D, and, through the medium of the double cranks G³, operates two pairs of stokers, H.

Mounted in the arms E and braces E' is another shaft, E², which is provided with two opposite cranks, $e$, and with pulleys $e'$ $e^2$ and screw-gear $e^3$. The cranks $e$ have each a pitman, $e^4$, which, at its opposite end, is attached to an elbow-lever, $f^2$, pivoted at its angle to a bracket, $f^3$, attached to the brace E'. These elbow-levers are attached at their outer ends to the cutter-bar, and serve to reciprocate it.

Pivoted on the end of the boiler, at each side, in suitable brackets, is an elbow-lever, I, one arm of which is provided with a spring-latch, $i$, to engage in a curved rack, $i'$, attached to the front of the boiler. The other end of the elbow-lever I has pivoted to it a link, I', which is at its opposite end pivoted to and supports a long arm, J, which extends in front of and above the cutter-bar, and is pivoted to a bracket, J', attached to the brace E'. The arms J carry at their front ends and are supported by caster-wheels J³. Journaled in the outer end of the arms or brackets E is a shaft carrying a drum, K, and on the shaft D is another drum. On these two drums is an endless belt or apron, L, having projections $l$, serrated or toothed, as shown.

Mounted at each end of the cutter-bar is a drum, and alongside of and parallel with the arms E are two shafts carrying drums. These drums carry endless belts or carriers $n$, set parallel with the cutter-bar, and immediately in the rear thereof. These carriers are provided with guard-boards, as shown in Fig. 1.

Upon brackets N is mounted a shaft carrying a reel or brush, O, which is revolved by a belt, $n'$, from the pulley $e^2$ on the shaft $E^2$, crossed, as shown in Fig. 1.

The shafts $m$, which drive the belts or carriers $n$, are driven by means of a worm-gear connection with the shaft $E^2$. The stokers H are pivoted to the ends of pitmen H', attached to and operated by the double cranks $G^3$ on the shaft G'. They are, at the points where they pivot to the pitmen, supported by links $H^2$, pivoted on the shaft heretofore mentioned as supporting the elbow-lever I. The stokers are provided with downward forward projecting teeth $h'$, and operate in tubes $H^3$, extending from the end of the boiler through the fire wall or bridge $h^3$ into the fire-box $h^4$. These tubes are provided with ventilating-tubes $h'$, communicating by means of $h^3$, and opening through the side of the boiler at their forward ends, $h^5$, to convey the steam generated in tubes $H^3$ to the outer air.

The operation of my device is as follows: The harvesting machinery is set in position in front of the engine. The engine is fired up and started. The piston and pitman driving the face-plate or pulley $B^3$ in the direction of the arrow thereon (shown in Fig. 1) causes the driving-wheel $B^4$, through its connecting-gears, to move in the direction of the arrows shown on its circumference in Fig. 1. This causes the engine to move over the ground, pushing the harvester before it. The same movement of the pulley $B^3$ causes the pulley C and shaft D to move, which in its turn, by means of the pulley C' on the same shaft and the pulley $c'$ on the shaft $E^2$, causes the last-named shaft to revolve. This revolution of the shaft $E^2$, by means of the cranks $e$ and elbow-levers $f^2$, causes the reciprocation of the cutter-bar $f$, by means of which the stubble is cut.

The brush or reel O, revolved by the belt $n'$ from the pulley $e^2$ on the shaft $E^2$, brushes the stubble backward upon the endless belts or carriers $n$, by means of which it is carried to the central portion of the cutter-bar and delivered upon the inclined carrier L, being prevented from slipping back by means of the serrated or toothed projections $l$. This inclined carrier lands it at the end of the boiler in the mouth of the tube $H^3$, where the stokers seize it and carry it through to the fire-box $h^3$, to be utilized as fuel to run the engine. Should it be found that too much stubble is conveyed, and there is liability of choking or smothering the fire, the supply may be lessened by raising the cutter-bar, so that the cut stubble will be shorter, through the medium of the arms J, operated by the link I' and elbow-lever I, and held, when adjusted, by the latch $i$, held in the rack $i'$. The supply may be increased, when desired, by lowering the cutter in the same manner. There will be usually a considerable quantity of steam generated in the tubes $H^3$ by reason of the natural dampness or moisture of the stubble. For the purpose of getting rid of this the tubes $h'$ are provided, which serve, by means of their inlet-pipes $h^2$ and outlet $h^5$, to carry all such steam to outer air.

My traction-engine will at the same time that it is propelling the harvester in front of it drag plows for breaking up the ground behind it, thus getting rid of the refuse or stubble of one crop and preparing the ground for another crop by one and the same operation. Much time and labor will be thus saved, and, as will be seen, the refuse stubble is not only effectually gotten rid of, but it is also utilized as fuel for the engine in plowing the ground.

It will be understood that many changes may be made in the mechanism for producing these results without departing from the spirit of my invention. Consequently I do not confine myself to the exact mechanism shown; but, Having fully described my invention, what I claim, and desire to secure by Letters Patent, is—

1. The combination of a traction-engine with a cutter-bar for cutting stubble, and means for conveying the stubble to the boiler of the engine, the cutter-bar and conveyer being operated by the propelling mechanism of the engine, as set forth.

2. The combination, substantially as described, of a traction-engine, a cutter-bar, a horizontal conveyer, and an inclined conveyer, all operated by the propelling-power of the engine, whereby the stubble is conveyed to the center of the cutter-bar, and from thence to the engine, to be used as fuel, as set forth.

3. The combination, substantially as described, with a traction-engine, a cutter-bar, and means for conveying the stubble to the engine, of stokers automatically operated by the engine, in the manner described.

4. The combination, substantially as described, of a traction-engine, a cutter-bar, conveyers to land the cut stubble at the front of the boiler, and stokers to carry it to the fire-box, all operated by the propelling mechanism of the engine, as set forth.

5. The combination, substantially as described, of the boiler A, shaft D, pivoted in brackets D', attached thereto, bracket E, pivoted on said shaft, and cutter-bar F, attached to said arms, as set forth.

6. The combination of the boiler A, brackets D'', shaft D', brackets E, pivoted thereto, cutter-bar F, and pulley C' on the shaft D, whereby the cutter-bar may be raised and lowered without altering the tension of the belts for driving it, as set forth.

7. The combination of the boiler A, bracket D', attached thereto, shaft D, arms E, cutter-bar F, brackets J', and levers J, as set forth.

8. The combination, with boiler A, of shaft

G', mounted in brackets G, and having cranks G³, links H², pitman H', and stokers H, as set forth.

9. The combination, with the traction-engine and its driving mechanism, of the harvester operated by said mechanism and provided with means, substantially as described, for adjusting the height of the cutter-bar from the ground, and thereby obtaining a larger or a shorter cut of stubble for lessening or increasing the amount of fuel supplied to the engine, as set forth.

10. The combination, with the brackets E, pivoted to the boiler and carrying the cutting-bar at their front ends, of the brackets J', the arms J, wheels J³, link I', and elbow-lever I, pivoted to the boiler, for the purpose set forth.

In testimony whereof I have hereunto subscribed my name.

BENJAMIN S. BENSON.

In presence of—
  J. C. BENSON,
  B. S. BENSON.